March 13, 1945.  E. G. NORTON  2,371,349

PROCESS OF PREPARING PLASTIC MATERIAL

Filed March 24, 1941

INVENTOR
BY Edward G. Norton
S. M. Evans
ATTORNEY

Patented Mar. 13, 1945

2,371,349

UNITED STATES PATENT OFFICE 2,371,349

PROCESS OF PREPARING PLASTIC MATERIAL

Edward G. Norton, Springfield, Mass., assignor to Monsanto Chemical Company, St. Louis, Mo., a corporation of Delaware Application March 24, 1941, Serial No. 385,037

8 Claims. (Cl. 18—47.5)

This invention relates to a new method for producing novel color effects in plastic materials.

For certain uses, plastic materials achieve a considerable degree of sales appeal as a result of their decorative appearance. Thus, plastic manufacturers are constantly striving for new color effects and means for producing the same. Among the more popular color effects in plastic articles of a utilitarian and/or ornamental nature, such as pen barrels, buttons, buckles, hair ornaments and the like, are mottled colors, with at least a portion of the color patterns approximating the appearance of mother-of-pearl to a greater or lesser degree.

Color effects simulating that of mother-of-pearl are variously described as pearl, pearl-like, pearlescent, etc. The closeness with which the appearance of natural pearls is approached, varies widely and depends to some degree on the pearl effect material incorporated in the plastic material to produce the pearlescent appearance. These pearl effect materials may be genuine fish scale essence, or synthetic fish scale material, such as bismuth oxy-chloride, and the like, or even metallic pigments such as aluminum powder. These pearl-effect materials appear to have one characteristic in common, namely, they each comprise flat lamellar particles, the broad surfaces of which are highly light reflecting. Hereinafter these materials will be described as lamellar materials and their individual particles as lamellae.

The essence of any process for imparting a pearlescent appearance to plastic materials comprises the orientation of the lamellar material in strata parallel or substantially parallel with the surface of the plastic material so that opportunity is afforded for light reflectance from the flat surfaces of the lamellae. Various methods have been proposed for orienting the particles of lamellar materials to form attractive pearlescent patterns in plastic material. However, many of the previous methods for producing such color effects have tended to comprise numerous tedious and expensive operations and have tended to produce, in some cases, only a very limited control of uniformity and/or diversity of pattern in the finished material.

It is an object of this invention to prepare plastic material with an unusual and attractive appearance. Another object is to prepare plastic material with a striped and pearl-like surface appearance. A further object is to provide an inexpensive method for producing sheets of plastic material with a striped and intermittently pearlescent surface appearance. Other objects will become apparent hereinafter.

According to the present invention, a new method has been discovered for producing plastic material with a mottled pearl-like surface appearance which can be adapted to produce a great variety of decorative and pearlescent effects. This new process comprises broadly the step of forming a sheet or other configuration of plastic material containing light reflecting lamellar particles, said particles being oriented about an axis or a plurality of substantially parallel axes, the broad surfaces of said particles being oriented parallel to said axis or axes, stacking a plurality of said sheets or other configurations with said axes substantially parallel, consolidating said stack and finally cutting the consolidated stack into sheets or other configurations in the usual manner in a direction that is preferably substantially parallel to said axis or axes. Sheets of plastic material produced by this process contain lamellae with their broad surfaces oriented at various angles to the broad surfaces of the sheets, the exact proportion of lamellae that are substantially parallel to the sheet surfaces depending, at least in part, on the manner in which the intermediate lamellae-containing plastic material was prepared.

The preferred method of preparing the intermediate plastic material containing lamellae oriented in strata surrounding and parallel to a plurality of substantially parallel axes, comprises forming a rod containing lamellae oriented in strata encircling or surrounding the major axis of the rod and with their broad surfaces oriented substantially parallel to the major axis, stacking a plurality of such rods with their major axes in substantially parallel relationship, consolidating the resulting stack and finally cutting the resulting press cake into sheets or other configurations in a direction that is preferably at right angles or substantially at right angles to the major axes of the rods in the consolidated plastic mass.

Substantially all of the lamellae in intermediate sheets prepared in the foregoing manner will be found to be oriented substantially at right angles to the cut surfaces of the sheets and in strata encircling or surrounding points corresponding to the major axes of the rods before the consolidation of the stack. When such sheets are subjected to the stacking, consolidating and cutting operations described hereinbefore, the final sheets have been found to present stripes intermittently graduating from pearlesence to non-pearlescene in appearance, with a high degree of regularity of pattern throughout the sheet. The cross-sections of the rods employed in preparting the hereinbefore described intermediate plastic material may possess a circular, elliptical, rectangular, or any desired configuration. In place of rod material, tubes containing lamellae oriented in a direction parallel to their major axes may be employed according to this invention or, in another embodiment of this invention, cylindrically wound sheets of plastic material containing lamellae oriented parallel to the broad surfaces of the sheets, so that the lamellae are thus oriented substantially parallel to the major axes of the cylinders and in strata surrounding the major axis, have been employed.

Variation is introduced into the color pattern of the products of the preferred process of this invention in various other ways. Thus, one method comprises the employ of mixtures of differently colored lamellae containing materials at either or both of the two stages at which stacking operations are performed. Another method comprises introducing plastic material free from lamellae at either or both of these stacking operations in order to add to the intermittent pearlescent and non-pearlescent appearance. A very important means of controlling and varying the pattern of the product comprises variation in the size and/or shape of the sections of plastic material employed at either stacking operation. Thus, for example, the lamellae-containing material employed in the first stacking operation may comprise various sizes of rods, tubes, cylindrically wound sheets and other shapes. Any materials, free from lamellae, employed at this or at the second stacking stage, may comprise shapes similar to or different from those of the lamellae-containing material. It is obvious that the shape of the stacked material will tend to affect the volume of the voids between the stacked material and, accordingly, the degree to which the material will flow during the subsequent pressing operation. Consequently, there will tend to be a variation in the distortion of the individual sections which, in turn, will tend to cause a variation in the orientation of the lamellae in the final product and a greater or lesser degree of undulation. This undulation may be further accented by deliberately spacing the stacked sections apart from each other prior to either pressing operation. Other variations within the scope of this invention include intermingling preformed components at either or both stacking operations, which differ as to the type of lamellar particles employed and selection of any desired arrangement of lamellae-containing and lamellae-free material during either or both stacking operations.

Orientation of the lamellae in the material employed in the first stacking operation of the preferred process of this invention is preferably accomplished by extrusion of plastic material of suitable consistency, containing the light-reflecting lamellar particles. However, when sheet material is to be wound into cylindrical form, said sheet material may be prepared either by extrusion or by depositing films of flowable solutions of the plastic material containing the lamellar particles, on a suitable surface by well known means so as to orient the lamellae in strata parallel with the broad surfaces of the sheet material.

The accompanying drawing illustrates several steps of one embodiment of this invention and an alternative arrangement.

The process of the present invention is illustrated by the following example, reference being made to Figs. 1–5 of the accompany drawing.

*Example 1*

Figure 1:
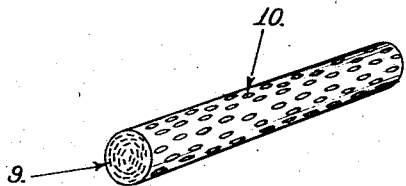
Fig. 1 is a perspective view of an extruded lamellae-containing rod in which the lamellae have their broad surfaces oriented about the major axis of the rod and parallel with said major axis.

A mass of cellulose nitrate plastic of suitable consistency, colored to any desired shade and containing a suitable amount of light reflecting lamellar particles, as for example, fish scale, was extruded into a rod of any desired diameter, as for example, a one-half inch diameter rod. The extrusion was carried out by means of suitable extruding apparatus under such conditions that the fish scale lamellae were oriented with their broad surfaces in strata encircling or surrounding the major axis of the rod and parallel to said major axis. A perspective view of such a rod is shown by Fig. 1, the narrow edges of the lamellae indicated at 9 showing their orientation in strata about the major axis of the rod and the broad surfaces of the lamellae, greatly exaggerated in size, indicated at 10 on the surface of the rod.

Figure 2:
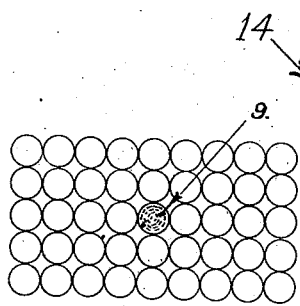
Fig. 2 is a top plan view of vertically stacked rods of the type shown in Fig. 1.
Figure 3:
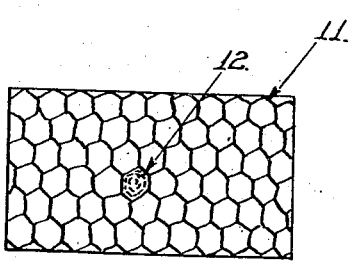
Fig. 3 is a top plan view of a sheet produced from the stack shown in Fig. 2 with the outlines of the positions occupied by the rods after consolidation indicated.
Figure 6:
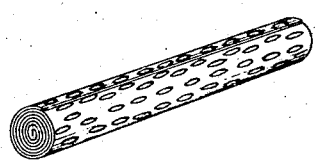
Fig. 6 illustrates a perspective view of a cylindrically wound sheet of pearlescent material in which the lamellae have their broad surfaces oriented about the major axis of the cylinder and parallel to said major axis.

After the pearlescent rod was extruded, it was cut into suitable lengths and a press cake chase was filled with these rod sections, stacked on end in a substantially vertical position. Such a stack is illustrated by Fig. 2, the press cake chase not being shown. The stacked rods were then pressed with the application of heat in the customary manner for preparing cellulose plastic cakes. The finished cake was then sheeted in a horizontal plane in the customary manner to produce sheets, which in this case, were made $\frac{1}{16}$ inch in thickness. A sheet illustrative of this stage of the process is shown by Fig. 3, the shape assumed by the rods in the cake as a result of the pressing operation being indicated in general by the lines 11. The fish scale lamellae are now oriented in strata perpendicular to the broad surfaces of the sheets and at various angles encircling or surrounding points approximately at the center of these irregular areas 11, as indicated at 12 for one section.

Figure 4:
Fig. 4 is a top plan view of the sheets shown in Fig. 3 after being vertically stacked.
Figure 5:
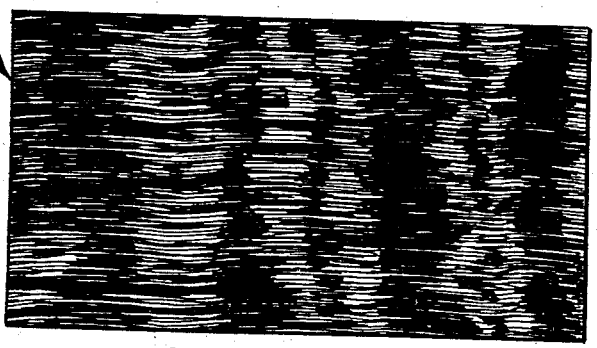
Fig. 5 is a top plan view illustrating in general a sheet produced from the stack shown in Fig. 4.

A press cake chase was then filled with these sheets, or sections of these sheets, stacked on edge with their broad surfaces extending lengthwise of the chase. Such a stack is illustrated by Fig. 4, the sheets being indicated by 13, the chase not being shown. This stack was then subjected to heat and pressure in the usual manner and the press cake so formed was sheeted into $\frac{1}{16}$ inch sheets. This sheeting operation cut through sections occupied by horizontally oriented pearl-effect material lamellae at intermittent points as is obvious from consideration of the distribution indicated at 12 in Fig. 3. The appearance of a finished sheet prepared according to the example of the process of this invention is illustrated in Fig. 5, stripes being indicated at 14.

The degree of brightness of the pearlescent stripes in a sheet prepared in the foregoing manner, depends on the orientation of the fish scale in any particular section of the sheet and the distances between the brightest portions depend to a large extent on the diameter of the rod originally employed. Some portions of the stripes are brilliantly pearlescent, while others simply show the color of the plastic material and others are intermediate in their pearlescence, the gradation being either gradual or abrupt. The widths of the individual stripes are, in general, those of the sheets employed in preparing the second stack, because the chances of two or more identically oriented sections in two or more stacked sheets lining up side by side are extremely small. The straightness of the stripes depends on the degree of distortion occurring during the final pressing operation and it is obvious that this is dependent upon the compactness of the stack before pressing. The appearance of the products of this example is further characterized by substantially uniform brightness across the width of a stripe at any particular point. This appears to be the result of the use of plastic material in the final stacking operation that contains lamellae that are substantially all parallel to a plurality of substantially parallel axes. Thus, while the stripes present an intermittently pearlescent and non-pearlescent appearance throughout their length, they are substantially uniform across their width as indicated above.

In Example 1, cellulose nitrate plastic was employed to illustrate the process of this invention. As is obvious to those skilled in the art, other platic materials are also employable according to the process of this invention. Thus, the plastic employed may have as a basis thermoplastic materials in general, as for example, cellulose esters and mixed esters such as cellulose acetate, cellulose propionate, cellulose butyrate, cellulose acetobutyrate, cellulose nitroacetate; cellulose ethers such as ethyl cellulose and benzyl cellulose; vinyl resins, such as polyvinyl acetals, as exemplified by polyvinyl butyraldehyde acetal, and polyvinyl formaldehyde acetal, polystyrene, polymethyl methacrylate; various thermoplastic copolymers of vinyl compounds, and other thermoplastic materials known to those skilled in the art.

This invention is limited solely by the claims attached hereto.

What is claimed is:

1. A process of preparing sheets of plastic material possessing a pearlescent appearance which comprises forming sheets of plastic material containing light reflecting lamellar particles, substantially all of said particles being oriented in a plurality of strata at right angles to the broad surfaces of the sheets, stacking said sheets with their broad surfaces adjacent, consolidating the resulting stack into a press cake and then cutting said press cake into sheets in a direction substantially at right angles to the broad surfaces of the consolidated sheets.

2. A process of preparing plastic sheet material possessing a pearlescent appearance which comprises cutting a press cake into sheets containing light reflecting lamellar particles, substantially all of said particles being oriented in a plurality of strata at substantially right angles to the broad surfaces of the sheets, stacking said sheets with their broad surfaces adjacent, consolidating the resulting stack into a press cake, and then cutting said press cake into sheets in a direction substantially at right angles to the broad surfaces of the consolidated sheets.

3. A process of preparing plastic material having stripes that are intermittently pearlescent and non-pearlescent in appearance which comprises stacking in substantially parallel relationship cylindrical sections of plastic material containing light reflecting lamellar particles with their broad surfaces oriented in strata about the major axes of the sections and substantially parallel to said major axes, consolidating the resulting stack into a solid block of plastic, sheeting said block at substantially right angles to the major axes of the consolidated sections, stacking the resulting sheets on edge, consolidating the resulting stack into a solid block of plastic and finally sheeting said block at substantially right angles to the broad surfaces of the consolidated sheets, thereby forming sheets having stripes intermittently pearlescent and non-pearlescent.

4. A process of preparing plastic material having stripes intermittently pearlescent and non-pearlescent in appearance, which comprises stacking, in substantially parallel relationship, extruded rods containing light reflecting lamellar particles with their broad surfaces oriented in strata about the major axes of the rods and substantially parallel to said major axes, consolidating the resulting stack into a solid block of plastic, sheeting said block at substantially right angles to the major axes of the consolidated rods, stacking the resulting sheets on edge, consolidating the resulting stack into a solid block of plastic and finally sheeting said block at substantially right angles to the broad surfaces of the consolidated sheets, thereby forming sheets having stripes intermittently pearlescent and non-pearlescent.

5. A process of preparing plastic material having stripes that are intermittently pearlescent and non-pearlescent in appearance, which comprises stacking in substantially parallel relationship cylindrically wound sheets of plastic material containing light reflecting lamellar particles oriented substantially parallel to the broad surfaces of said sheets, consolidating the resulting stack into a solid block of plastic, sheeting said block at substantially right angles to the major axes of the consolidated cylindrically wound sheets, stacking the resulting sheets with their broad surfaces adjacent, consolidating the resulting stack into a solid block of plastic and finally sheeting said block at substantially right angles to the broad surfaces of the consolidated sheets thereby forming sheets having stripes intermittently pearlescent and non-pearlescent.

6. A process of preparing plastic material possessing a pearlescent appearance which comprises forming sheets of plastic material containing light reflecting lamellar particles, substantially all of said particles being oriented in a plurality of strata at right angles to the broad surfaces of sheets, stacking said sheets with their broad surfaces adjacent, consolidating the resulting stack into a press cake, and then cutting said press cake in a direction substantially at right angles to the broad surfaces of the consolidated sheets.

7. A process of preparing plastic material possessing a pearlescent appearance which comprises cutting a press cake into sheets containing light reflecting lamellar particles, substantially all of said particles being oriented in a plurality of strata at substantially right angles to the broad surfaces of the sheets, stacking said sheets with their broad surfaces adjacent, consolidating the resulting stack into a press cake, and then cutting said press cake in a direction substantially at right angles to the broad surfaces of the consolidated sheets.

8. A process of preparing plastic material having stripes intermittently pearlescent and non-pearlescent in appearance, which comprises stacking, in substantially parallel relationship, extruded rods containing light reflecting lamellar particles with their broad surfaces oriented in strata about the major axes of the rods and substantially parallel to said major axes, consolidating the resulting stack into a solid block of plastic, sheeting said block at substantially right angles to the major axes of the consolidated rods, stacking the resulting sheets on edge, consolidating the resulting stack into a solid block of plastic and finally cutting said block at substantially right angles to the broad surfaces of the consolidated sheets, thereby forming plastic material having stripes intermittently pearlescent and non-pearlescent.

EDWARD G. NORTON.